US012121912B2

(12) United States Patent
Höglund et al.

(10) Patent No.: US 12,121,912 B2
(45) Date of Patent: Oct. 22, 2024

(54) EXCHANGEABLE SEPARATION INSERT

(71) Applicant: ALFA LAVAL CORPORATE AB, Lund (SE)

(72) Inventors: Kasper Höglund, Rönninge (SE); Peter Thorwid, Sundbyberg (SE)

(73) Assignee: ALFA LAVAL CORPORATE AB, Lund (SE)

( * ) Notice: Subject to any disclaimer, the term of this patent is extended or adjusted under 35 U.S.C. 154(b) by 755 days.

(21) Appl. No.: 17/296,873

(22) PCT Filed: Dec. 9, 2019

(86) PCT No.: PCT/EP2019/084137
§ 371 (c)(1),
(2) Date: May 25, 2021

(87) PCT Pub. No.: WO2020/120357
PCT Pub. Date: Jun. 18, 2020

(65) Prior Publication Data

US 2022/0055043 A1 Feb. 24, 2022

(30) Foreign Application Priority Data

Dec. 10, 2018 (EP) .................................... 18211240
Dec. 10, 2018 (EP) .................................... 18211241

(51) Int. Cl.
*B04B 1/08* (2006.01)
*B04B 7/08* (2006.01)
(Continued)

(52) U.S. Cl.
CPC .................. *B04B 1/08* (2013.01); *B04B 7/08* (2013.01); *B04B 7/14* (2013.01); *B04B 9/12* (2013.01); *B04B 11/02* (2013.01)

(58) Field of Classification Search
CPC .... B04B 1/08; B04B 7/08; B04B 7/14; B04B 9/12; B04B 11/02
See application file for complete search history.

(56) References Cited

U.S. PATENT DOCUMENTS 2,104,683 A 1/1938 Rosen et al.
3,602,425 A 8/1971 Schmidt
(Continued)

FOREIGN PATENT DOCUMENTS

CN 101506552 A 8/2009
CN 102179317 A 9/2011
(Continued)

OTHER PUBLICATIONS

English translation of the Chinese Office Action and Search Report for corresponding Chinese Application No. 201980081546.5, dated Jul. 19, 2022.
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

An exchangeable separation insert for a centrifugal separator includes a rotor casing enclosing a separation space in which a stack of separation discs is arranged, and first and second stationary portions. A feed inlet supplies a fluid mixture to the separation space. The insert includes a light phase outlet and a heavy phase outlet. The feed inlet is arranged at a first axial end of the rotor casing. One of the light phase outlet and heavy phase outlet is arranged at a second axial end. A first rotatable seal seals and connects the feed inlet and a second rotatable seal seals and connects one of the light phase outlet and heavy phase outlet.

20 Claims, 2 Drawing Sheets

(51) Int. Cl.

| | |
|---|---|
| ***B04B 7/14*** | (2006.01) |
| ***B04B 9/12*** | (2006.01) |
| ***B04B 11/02*** | (2006.01) |

(56) References Cited

U.S. PATENT DOCUMENTS

| | | | |
|---|---|---|---|
| 6,439,577 | B2 | 8/2002 | Jorgensen et al. |
| 6,709,377 | B1 | 3/2004 | Rochat |
| 6,821,319 | B1 | 11/2004 | Moberg et al. |
| 7,037,428 | B1 | 5/2006 | Robinson et al. |
| 2002/0082154 | A1 | 6/2002 | Kessler et al. |
| 2008/0171645 | A1 | 7/2008 | Borgstrom et al. |
| 2011/0319248 | A1 | 12/2011 | Starbard |
| 2016/0184836 | A1 | 6/2016 | Mackel et al. |
| 2017/0189915 | A1 | 7/2017 | Mackel et al. |
| 2017/0203306 | A1 | 7/2017 | Penkl et al. |
| 2018/0147581 | A1 | 5/2018 | Quiter et al. |

FOREIGN PATENT DOCUMENTS

| | | | | |
|---|---|---|---|---|
| CN | 102596418 | A | 7/2012 | |
| CN | 103917299 | A | 7/2014 | |
| CN | 204564363 | U | 8/2015 | |
| CN | 106914348 | A | 7/2017 | |
| DE | 38 08 742 | A1 | 10/1988 | |
| DE | 10 2009 053 660 | B3 | 5/2011 | |
| EP | 0241128 | A1 * | 3/1987 | ............... B04B 1/08 |
| EP | 0346056 | A2 * | 12/1989 | ............... B04B 1/08 |
| EP | 2 392 405 | A2 | 12/2011 | |
| EP | 2567754 | A1 * | 3/2013 | ............... B04B 1/00 |
| EP | 3 384 993 | A1 | 10/2018 | |
| KR | 10-2009-0129747 | A | 12/2009 | |
| WO | WO 93/25314 | A1 | 12/1993 | |
| WO | WO 2008/013495 | A1 | 1/2008 | |
| WO | WO 2008/106409 | A1 | 9/2008 | |
| WO | WO 2011/056131 | A1 | 5/2011 | |
| WO | WO 2012/116571 | A1 | 9/2012 | |
| WO | WO 2014/000829 | A1 | 1/2014 | |
| WO | WO 2015/181175 | A2 | 12/2015 | |
| WO | WO 2015/181177 | A1 | 12/2015 | |
| WO | WO 2016/192927 | A1 | 12/2016 | |

OTHER PUBLICATIONS

English Translation of Korean Office Action for Korean Application No. 10-2021-7021219, dated Jan. 13, 2023.

International Search Report for PCT/EP2019/084137 (PCT/ISA/210) mailed on Jan. 15, 2020.

Written Opinion of the International Searching Authority for PCT/EP2019/084137 (PCT/ISA/237) mailed on Jan. 15, 2020.

Chinese Notice of Allowance and Search Report for Chinese Application No. 201980081546.5, dated Nov. 1, 2023, with a partial English translation.

* cited by examiner

EXCHANGEABLE SEPARATION INSERT

TECHNICAL FIELD

The present inventive concept relates to the field of centrifugal separators. More particularly it relates to an exchangeable separation insert for a centrifugal separator.

BACKGROUND

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

When processing pharmaceutical products, such as fermentation broths, it may be desirable to eliminate the need for cleaning-in-place processes of the rotating bowl and the separator parts that have contacted the processed product. More useful may be to exchange the rotating bowl as a whole, i.e. to use a single use solution. This is advantageous from a hygienic perspective of the process.

WO 2015/181177 discloses a separator for the centrifugal processing of a flowable product comprising a rotatable outer drum and an exchangeable inner drum arranged in the outer drum. The inner drum comprises means for clarifying the flowable product. The outer drum is driven via drive spindle by a motor arranged below the outer drum. The inner drum extends vertically upwardly through the outer drum which fluid connections arranged at an upper end of the separator.

However, there is a need in the art for single use solutions for centrifugal separation that are easy to handle for an operator.

SUMMARY

It is an object of the invention to at least partly overcome one or more limitations of the prior art. In particular, it is an object to provide an exchangeable separation insert that is allows for increased maneuverability and handling for the operator.

As a first aspect of the invention, there is provided an exchangeable separation insert for a centrifugal separator, comprising:

a rotor casing enclosing a separation space in which a stack of separation discs is arranged, the rotor casing being arranged to rotate around an axis (X) of rotation, a first stationary portion and a second stationary portion, said rotor casing being axially arranged between said first and said second stationary portion, a feed inlet for supply of the fluid mixture to be separated to said separation space, a light phase outlet for discharge of a separated phase of a first density, and a heavy phase outlet for discharge of a separated phase of a second density higher than said first density, wherein said feed inlet is arranged at a first axial end of said rotor casing, and wherein one of said light phase outlet and heavy phase outlet is arranged at a second axial end, opposite the first axial end, of the rotor casing, a first rotatable seal sealing and connecting said feed inlet to a stationary inlet conduit in said first stationary portion; and a second rotatable seal for sealing and connecting one of said light phase outlet and heavy phase outlet to a stationary outlet conduit in said second stationary portion.

The exchangeable separation insert, including the rotor casing, the first stationary portion, and the second stationary portion, may thus form a pre-assembled insert. The exchangeable separation insert may thus be ready for being inserted into a centrifugal separator. A rotatable member of the centrifugal separator may function as a rotatable support for the rotor casing of the insert. Such a rotating member may be part of a rotating assembly that may be connected to a drive unit for rotating the rotatable member around the axis of rotation (X).

According to embodiments, the exchangeable separation insert may form a pre-assembled insert configured to be handled as one unit. Thus, a user may easily handle the insert when it is to be arranged in a centrifugal separator, and similarly, when the insert is to be exchanged in the centrifugal separator for a new insert of the same or similar kind.

According to embodiments, the exchangeable separation insert is a single use separation insert. Thus, the insert may be adapted for single use and be a disposable insert. The exchangeable insert may thus be for processing of one product batch, such as a single product batch in the pharmaceutical industry, and then be disposed of.

The exchangeable separation insert may comprise a polymeric material or consist of a polymeric material. As an example, the rotor casing and the stack of separation discs may comprise, or be of, a polymeric material, such as polypropylene, platinum cured silicone or BPA free polycarbonate. The polymer parts of the insert may be injection moulded. However, the exchangeable separation insert may also comprise metal parts, such as stainless steel. For example, the stack of separation discs may comprise discs of stainless steel.

The exchangeable insert may be a sealed sterile unit.

The rotor casing encloses a separation space in which the separation of the fluid mixture, such as a gas mixture or a liquid mixture, takes place. The separation space comprises a stack of separation discs arranged centrally around the axis of rotation.

The rotor casing is further arranged between a first and second stationary portion, as seen in the axial direction. The first stationary portion may thus be a lower stationary portion and the second stationary portion may be an upper stationary portion.

The rotor casing is rotatable in relation to the first and second stationary portions.

The feed inlet, which is for supplying or guiding the fluid mixture to be separated to said separation space, is arranged at a first axial end of the rotor casing. This may be the lower end of the rotor casing. Furthermore, one of said light phase outlet and heavy phase outlet are arranged at the second axial end, opposite the first axial end, of the rotor casing. The second end may thus be the upper end of the rotor casing.

As an example, both the light phase outlet and the heavy phase outlet may be arranged at the second axial end. As an alternative, one of said light phase outlet and heavy phase outlet are arranged at the second axial end, whereas the other is arranged at the first axial end. As an example, the heavy phase outlet may be arranged at the second axial end and the light phase outlet and the feed inlet may be arranged at the first axial end.

There is a first rotatable seal sealing and connecting the feed inlet to a stationary inlet conduit. This inlet conduit is thus in the first stationary portion. There is also a second rotatable seal for sealing and connecting one of said light phase outlet and heavy phase outlet to a stationary outlet conduit in said second stationary portion.

Consequently, the first rotatable seal may be arranged at the border between the rotor casing and the first stationary portion, whereas the second rotatable seal may be arranged at the border between the rotor casing and the second stationary portion.

The rotatable seals may be mechanical seals. The mechanical seal may be a hermetic seal, which refers to a seal that is supposed to give rise to an air tight seal between a stationary portion and the rotor casing, i.e. prevent air from outside the rotor casing and exchangeable insert to contaminate the feed. Therefore, the rotor casing of the exchangeable separation insert may be arranged to be completely filled with liquid during operation. This means that no air or free liquid surfaces is meant to be present in the rotor casing during operation of the exchangeable separation insert. Thus, as used herein, a mechanically hermetic seal is a fully hermetic seal, as compared to a semi-hermetic seal, such as a hydro-hermetic seal.

The mechanical seal may comprise a stationary part and a rotatable part.

Thus in embodiments, the first rotatable seal comprises a stationary part arranged in the first stationary portion of the insert and a rotatable part arranged in the first axial end of the rotor casing.

Further, according to embodiments, the second rotatable seal comprises a stationary part arranged in the second stationary portion of the insert and a rotatable part arranged in the second axial end of the rotor casing.

Since the inlet conduit may be arranged at a lower axial end of the insert and at least one outlet conduit may be arranged at the upper axial end of the insert, the exchangeable separation insert may be arranged to be supplied with fluid mixture to be separated from the bottom of the insert and at least one of the separated phases may be arranged to be discharged from the upper end of the insert.

The first aspect of the invention is based on the insight that having the inlet at one axial end and two outlets at a second axial end of the exchangeable insert increases the maneuverability and handling of the insert by an operator. It is thus found that having a few connections at each end is better than having all connections at only one end of end exchangeable insert. Further, using both ends of the separator allows for both feeding the material to be processed at the rotational axis (X) and also discharging one of the separated phases at the rotational axis (X), thereby allowing one of the separated phases to be discharged with a decreased amount of rotational energy.

As an example, if the exchangeable separation insert is used for separating a cell culture mixture, the cell culture may be withdrawn directly from the bottom of a fermenter and be connected to the inlet at an axially lower end of the insert, and the separated heavy phase comprising cells may be discharged at the axially upper end of the insert, decreasing the rotational energy and shear forces experienced by the cells. This is advantageous, in that the exchangeable separator insert allows for a direct and easy connection from the bottom of the fermenter to the bottom of the separator insert.

In embodiments of the first aspect of the invention, said light phase outlet is arranged at the first axial end and the heavy phase outlet is arranged at the second axial end, and said second rotatable seal is for sealing and connecting said heavy phase outlet to a stationary outlet conduit in said second stationary portion.

Thus, the light phase may be discharged at the same axial end as where the feed is supplied.

Furthermore, the first rotatable seal may also be arranged for sealing and connecting said light phase outlet to a stationary outlet conduit in said first stationary portion.

The first rotatable seal may thus be a concentric double seal for sealing both the inlet and the light phase outlet.

As an alternative, there is a third mechanical seal, other than the first mechanical seal, for sealing and connecting the light phase outlet to a stationary outlet conduit in the first stationary portion.

In embodiments of the first aspect of the invention, the rotor casing is free of any further outlets for separated phases.

Thus, the rotor casing may be solid in that it is free of any peripheral ports for discharging e.g. a sludge phase accumulated at the periphery of the separation space. Thus, the exchangeable insert may comprise solely the light phase and the heavy phase outlet.

In embodiment of the first aspect of the invention, the separation space extends from a first axial position to a second axial position, and wherein the inner diameter of the separation space continuously increases from said first to said second axial position. As an example, the heavy phase collection space of the separation space may extend from a first axial position to a second axial position, and the inner diameter of the separation space may continuously increase from said first to said second axial position.

Thus, the inner diameter of the separation space may gradually increase in an axial direction. As an example, the first axial position may be closer to the inlet and the second axial position may be closer to the outlets. A continuous increase of the inner diameter, with no intermittent decrease, may facilitate collection of the separated heavy phase at the second axial position of the separation space.

In embodiment of the first aspect of the invention, the insert comprises at least one outlet conduit arranged for transporting a separated heavy phase from a radially outer position of the separation space to the heavy phase outlet.

The outlet conduit may be a pipe extending from a central portion out into the separation space. Such an outlet conduit may thus comprise a conduit inlet arranged at the radially outer position and a conduit outlet at a radially inner position. As an example, the insert may comprise a single outlet conduit. In other examples, the insert may comprise at least two such outlet conduits 23, such as at least three, such as at least five, outlet conduits 23.

The at least one outlet conduit may be arranged so that the conduit inlet opening in the separation space is at a position where the inner radius or diameter of the separation space is largest.

The at least one outlet conduit may be arranged at the axial end of the separation space that is closest to the heavy phase outlet. Thus, in embodiments of the first aspect of the invention, the at least one outlet conduit is arranged at the axially upper portion of the separation space. As an example, the outlet conduit may be arranged at the second axial position of the separation space.

The at least one outlet conduit may facilitate transport of the separated heavy phase in the separation space to the heavy phase outlet.

Further, the at least one outlet conduit may be arranged with a tilt, or at an angle, relative the radial plane from the conduit inlet to the conduit outlet. The tilt may be a tilt toward the outlet. This may facilitate transport of the separated heavy phase in the conduit.

In embodiments of the first aspect of the invention, the first stationary portion is arranged at an axial distance that is less than 20 cm, such as less than 10 cm, from the heavy phase collection space of the separation space.

The separation space may thus comprise a heavy phase collection space, which is a space that is radially outside the stack of separation discs. The separation space may also comprise a radially inner portion, which is thus formed by the interspaces between the discs of the stack of separation discs.

Consequently, the rotatable seal at the inlet may be arranged close to the rotor casing, i.e. the first stationary portion may be located close to the rotor casing.

This provides for a compact exchangeable separation insert that is easy to handle. Further, the rotatable part of the first rotatable seal may be arranged directly onto the axially lower portion of the rotor casing.

Further, also the second stationary portion may be arranged at an axial distance that is less than 20 cm, such as less than 10 cm, from the heavy phase collection space of the separation space. This will further increase the compactness of the separation insert.

As an example, the first stationary portion may be arranged less than 20 cm, such as less than 10 cm, from the stack of separation discs.

In embodiments of the first aspect of the invention, the feed inlet is arranged at the rotational axis (X). In embodiments of the first aspect of the invention, the stationary inlet conduit is arranged at the rotational axis (X).

In embodiments of the first aspect of the invention, the stationary outlet conduit for the separated heavy phase is arranged at the rotational axis (X). This may be advantageous in that it provides for a gentler treatment of the separated heavy phase. If this is discharged at a small radius from the rotational axis (X), the rotational forces are smaller. This may be an advantage e.g. when separating a cell culture. Such cells may be shear sensitive, so it may be advantageous to be able to discharge them at a small diameter from the rotational axis.

Furthermore, it may be advantageous in allowing both the inlet and one liquid outlet to be arranged at the axis of rotation. Consequently, in embodiments, all of the stationary inlet conduit, the feed inlet, the heavy phase outlet and the stationary outlet conduit for the separated heavy phase are arranged at the rotational axis (X).

In embodiments of the first aspect of the invention, the rotor casing is arranged to be solely externally supported by external bearings.

Thus, the rotor casing, as well as the whole exchangeable separation insert, may be free of any bearings.

Furthermore, the exchangeable separation insert may be free of any rotatable shaft that is arranged to be supported by external bearings.

In embodiments of the first aspect of the invention, the outer surface of the rotor casing comprises a first and second frustoconical portion defining the separation space therein, wherein the first frustoconical portion has an opening angle that is larger than the opening angle of the second frustoconical portion, and wherein the imaginary apex of the first and second frustoconical portions both point in the same axial direction along the rotational axis (X).

A frustoconical portion has thus a frustoconical shape, which refers to a shape having the shape of a frustum of a cone, which is the shape of a cone with the narrow end, or tip, removed. A frustoconical shape has thus an imaginary apex where the tip or apex of the corresponding conical shape is located. The axis of the frustoconical shape of the first and second frustoconical portions are axially aligned with the rotational axis of the rotor casing. The axis of the frustoconical portion is the direction of the height of the corresponding conical shape or the direction of the axis passing through the apex of the corresponding conical shape.

The outer surface of the rotor casing may thus comprise two frustoconical portions pointing at the same axial direction. The first and second frustoconical portions may be portions of the rotor casing that are at the same axial position as the separation space. Thus, also the inner surface of the separation space may comprise a first and second frustoconical portion, wherein the first frustoconical portion has an opening angle that is larger than the opening angle of the second frustoconical portion, and wherein the imaginary apex of the first and second frustoconical portions both point in the same axial direction along the rotational axis (X).

The first frustoconical portion may be arranged closer to the first axial end of the rotor casing than the second frustoconical portion. The first frustoconical portion may have the same opening angle as frustoconical separation discs of the stack of separation discs.

Further, as an example, the opening angle of the second conical portion is such that the outer surface of second frustoconical portion forms an angle $\alpha$ relative the rotational axis that is less than 10 degrees. This may allow easy handling of the exchangeable separation insert, e.g. when inserting the insert into a rotatable member of a centrifugal separator or when taking it out from a separator and exchanging it for another exchangeable insert.

In embodiments of the first aspect, the exchangeable insert is further comprising conduits for supplying a liquid to said first and/or at least one second rotatable seal.

Thus, there may be conduits in the first stationary portion for supplying a liquid, such as a cooling liquid, to the first rotatable seal. There may further be conduits in the second stationary portion for supplying a liquid, such as a cooling liquid, to the at least one second rotatable seal.

The stack of separation discs arranged in the separation space are arranged centrally around the axis of rotation (X). Such separation discs form separating surface enlarging inserts in the separation space. The separation discs may have the form of a truncated cone, i.e. the stack may be a stack of frustoconical separation discs. Thus, in embodiments of the first aspect, the stack of separation discs comprises frustoconical separation discs.

As an example, the frustoconical separation discs may have an imaginary apex pointing towards said first stationary portion. The imaginary apex may thus point toward the feed inlet and the axially lower part of the separator. Further, the imaginary apex of the axially lowermost separation disc that is closest to the first end of the insert may be arranged less than 10 cm from the first stationary portion. This further makes the exchangeable separation insert more compact.

When the frustoconical separation discs are arranged with the imaginary apex pointing towards the first stationary portion, then the first stationary portion may be arranged at an axial distance that is less than 20 cm, such as less than 10 cm, from the heavy phase collection space of the separation space The separation discs may alternatively be axial discs arranged around the axis of rotation.

The separation discs may e.g. comprise a metal or be of metal material, such as stainless steel. The separation discs may further comprise a plastic material or be of a plastic material.

According to a second aspect of the present inventive concept there is provided a method for separating at least two components of a fluid mixture which are of different densities, comprising the steps of:

a) providing a centrifugal separator comprising the exchangeable separation insert according to the first aspect above;
b) supplying said fluid mixture to the feed inlet to said separation space;
c) discharging a separated light phase from said separation space via the light phase outlet; and
d) discharging a separated heavy phase from said separation space via the heavy phase outlet.

This aspect may generally present the same or corresponding advantages as the former aspect. The terms and definitions used in relation to the second aspect are the same as discussed in relation to the first aspect above.

The fluid mixture may for example be a cell culture mixture, such as a mammalian cell culture mixture. The separated heavy phase may thus comprise a separated cell phase from the cell culture mixture.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings, like reference numerals will be used for like elements unless stated otherwise.

DETAILED DESCRIPTION

Figure 1:
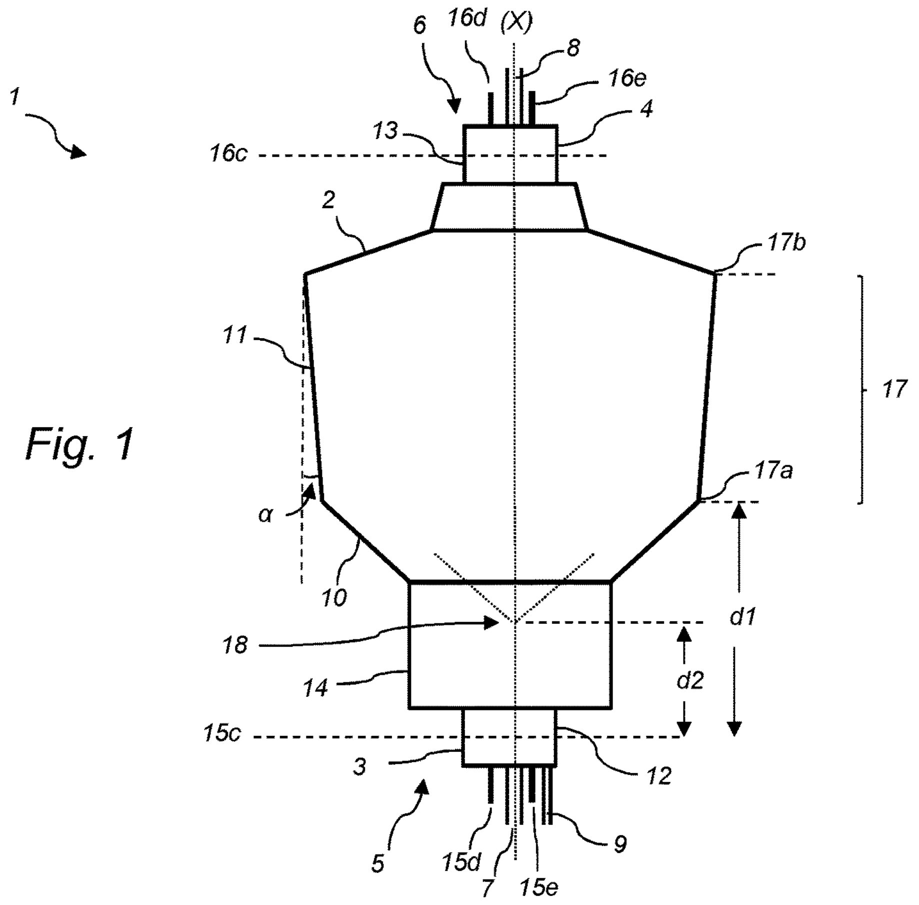
FIG. 1 is a schematic outer side view of an exchangeable separation insert according to the present disclosure.

FIG. 1 shows an outer side view of an exchangeable separation insert 1 according to the present disclosure. The insert 1 comprises a rotor casing 2 arranged between a first, lower stationary portion 3 and a second, upper stationary portion 4, as seen in the axial direction defined by rotational axis (X). The insert 1 comprises the first stationary portion 3 which is arranged at the lower axial end 5 of the insert 1. The insert 1 comprises the second stationary portion 4 which is arranged at the upper axial end 6 of the insert 1.

The feed inlet is in this example arranged at the axial lower end 5, and the feed is supplied via a stationary inlet conduit 7 arranged in the first stationary portion 3. The stationary inlet conduit 7 is arranged at the rotational axis (X). The first stationary portion 3 further comprises a stationary outlet conduit 9 for the separated liquid phase of lower density, also called the separated liquid light phase.

There is further a stationary outlet conduit 8 arranged in the upper stationary portion 4 for discharge of the separated phase of higher density, also called the liquid heavy phase. Thus, in this embodiment, the feed is supplied via the lower axial end 5, the separated light phase is discharged via the lower axial end 5, whereas the separated heavy phase is discharged via the upper axial end 6.

The outer surface of the rotor casing 2 comprises a first 10 and second 11 frustoconical portion. The first frustoconical portion 10 is arranged axially below the second frustoconical portion 11. The outer surface is arranged such that the imaginary apex of the first 10 and second 11 frustoconical portions both point in the same axial direction along the rotational axis (X), which in this case is axially down towards the lower axial end 5 of the insert 1.

Furthermore, the first frustoconical portion 10 has an opening angle that is larger than the opening angle of the second frustoconical portion 11. The opening angle of the first frustoconical portion may be substantially the same as the opening angle of a stack of separation discs contained within the separation space 17 of the rotor casing 2. The opening angle of the second frustoconical portion 11 may be smaller than the opening angle of a stack of separation discs contained within the separation space of the rotor casing 2. As an example, the opening angle of the second frustoconical portion 11 may be such that the outer surface forms an angle $\alpha$ with rotational axis that is less than 10 degrees, such as less than 5 degrees. The rotor casing 2 having the two frustoconical portions 10 and 11 with imaginary apexes pointing downwards allows for the insert 1 to be inserted into a rotatable member 30 from above. Thus, the shape of the outer surface increases the compatibility with an external rotatable member 30, which may engage the whole, or part of the outer surface of the rotor casing 2, such as engage the first 10 and second 11 frustoconical portions.

There is a lower rotatable seal arranged within lower seal housing 12 which separates the rotor casing 2 from the first stationary portion 3 and an upper rotatable seal arranged within upper seal housing 13 which separates the rotor casing 2 from the second stationary portion 4. The axial position of the sealing interface within the lower seal housing 12 is denoted 15*c*, and the axial position of the sealing interface within the upper seal housing 13 is denoted 16*c*. Thus, the sealing interfaces formed between such stationary part 15*a*, 16*a* and rotatable part 15*b*, 16*b* of the first 15 and second 16 rotatable seals also form the interfaces or border between the rotor casing 2 and the first 15 and second 16 stationary portions of the insert 1.

There are further a seal fluid inlet 15*d* and a seal fluid outlet 15*e* for supplying and withdrawing a seal fluid, such as a cooling liquid, to the first rotatable seal 15 and in analogy, a seal fluid inlet 16*d* and a seal fluid outlet 16*e* for supplying and withdrawing a seal fluid, such as a cooling liquid, to the second rotatable seal 16.

Shown in FIG. 1 is also the axial positions of the separation space 17 enclosed within the rotor casing 2. In this embodiment, the separation space is substantially positioned within the second frustoconical portion 11 of the rotor casing 2. The heavy phase collection space (17*c*) of the separation space 17 extends from a first, lower, axial position 17*a* to a second, upper, axial position 17*b*. The inner peripheral surface of the separation space 17 may form an angle with the rotational axis (X) that is substantially the same as angle $\alpha$, i.e. the angle between the outer surface of the second frustoconical portion 11 and the rotational axis (X). The inner diameter of the separation space 17 may thus increase continuously from the first axial position 17*a* to the second axial position 17*b*. Angle $\alpha$ may be less than 10 degrees, such as less than 5 degrees.

The exchangeable separation insert 1 has a compact form that increases the maneuverability and handling of the insert 1 by an operator. As an example, the axial distance between the separation space 17 and the first stationary portion 3 at the lower axial end 5 of the insert may be less than 20 cm, such as less than 15 cm. This distance is denoted d1 in FIG. 1 and is in this embodiment the distance from the lowest axial position 17*a* of the heavy phase collection space (17*c*) of the separation space 17 to the sealing interface 15*c* of the first rotatable seal 15. As a further example, if the separation space 17 comprises a stack of frustoconical separation discs, the frustoconical separation disc that is axially lowest in the stack and closest to the first stationary portion 3, may be arranged with the imaginary apex 18 positioned at an axial distance d2 from the first stationary portion 3 that is less than 10 cm, such as less than 5 cm. Distance d2 is in this embodiment the distance from the imaginary apex 18 of the axially lowermost separation disc to the sealing interface of the first rotatable seal 15.

Figure 2:
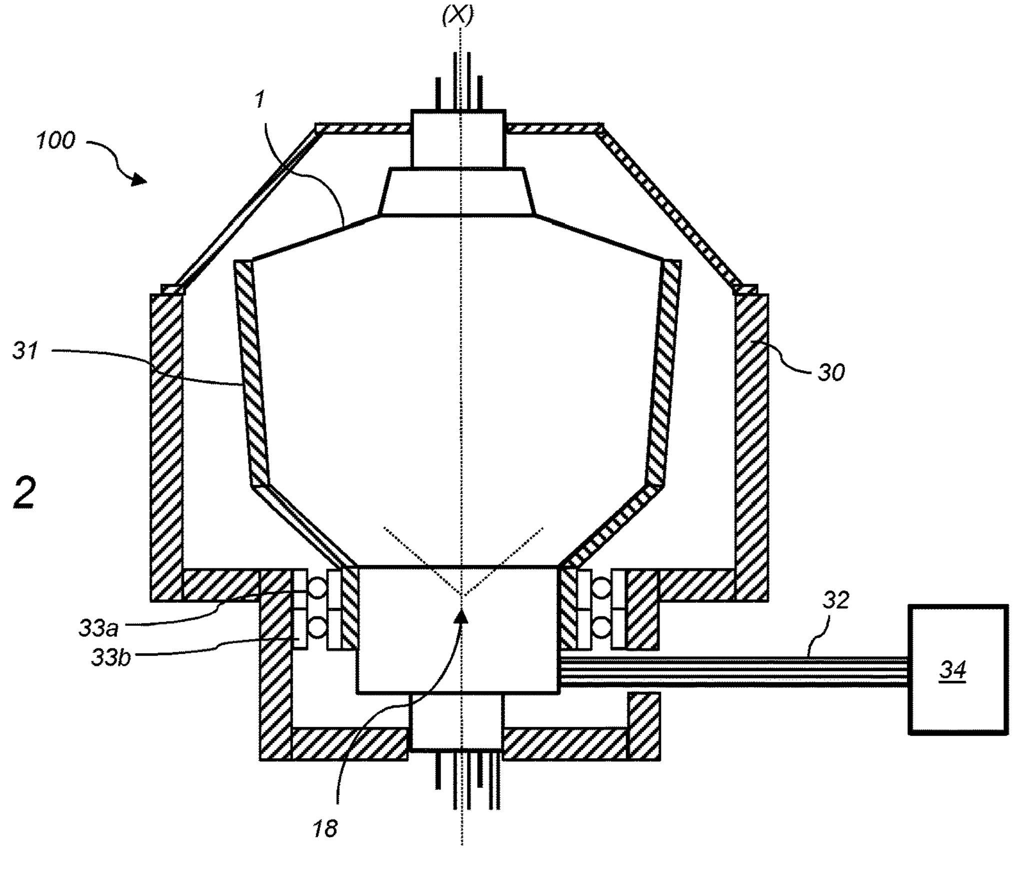
FIG. 2 is a schematic section of a centrifugal separator comprising an exchangeable insert according to the present disclosure.

FIG. 2 shows a schematic drawing of the exchangeable separation insert 1 being inserted within centrifugal separator 100, which comprises a stationary frame 30 and a rotatable member 31 that is supported by the frame by means of supporting means in the form of an upper and lower ball bearing 33*a*, 33*b*. There is also a drive unit 34, which in this case is arranged for rotating the rotatable member 31 around the axis of rotation 31 via drive belt 32. However, other driving means are possible, such as an electrical direct drive.

The exchangeable separation insert 1 is inserted and secured within rotatable member 31. The rotatable member 31 thus comprises a through hole with an inner surface for engaging with the outer surface of the rotor casing 2. That is, the rotor casing 2 of the insert 1 is secured within the rotatable member 31. The first and second stationary portions 3, 4 extend out of the rotatable member 31 and are secured in the centrifugal separator 100 such that they remain stationary during use of the centrifugal separator 100.

After mounting of the insert 1, the upper and lower ball bearings 33*a*, 33*b* are both positioned axially below the separation space 17 within the rotor casing 2 such that the cylindrical portion 14 of the outer surface of the rotor casing 2 is positioned axially at the bearing planes. The cylindrical portion 14 thus facilitates mounting of the insert within at least one large ball bearing. The upper and lower ball bearings 33*a*, 33*b* may have an inner diameter of at least 80 mm, such as at least 120 mm.

Further, as seen in FIG. 2, the insert 1 is positioned within rotatable member 31 such that the imaginary apex 18 of the lowermost separation disc is positioned axially at or below at least one bearing plane of the upper and lower ball bearings 33*a*, 33*b*.

Moreover, the separation insert is mounted within the separator 1 such that the axial lower part 5 of the insert 1 is positioned axially below the supporting means, i.e. the upper and lower bearings 33*a*, 33*b*. The rotor casing 2 is in this example arranged to be solely externally supported by the rotatable member 31. The separation insert 1 is further mounted within the separator 100 to allow easy access to the inlet, outlets and rotatable seals from the outside of the insert 1.

Figure 3:
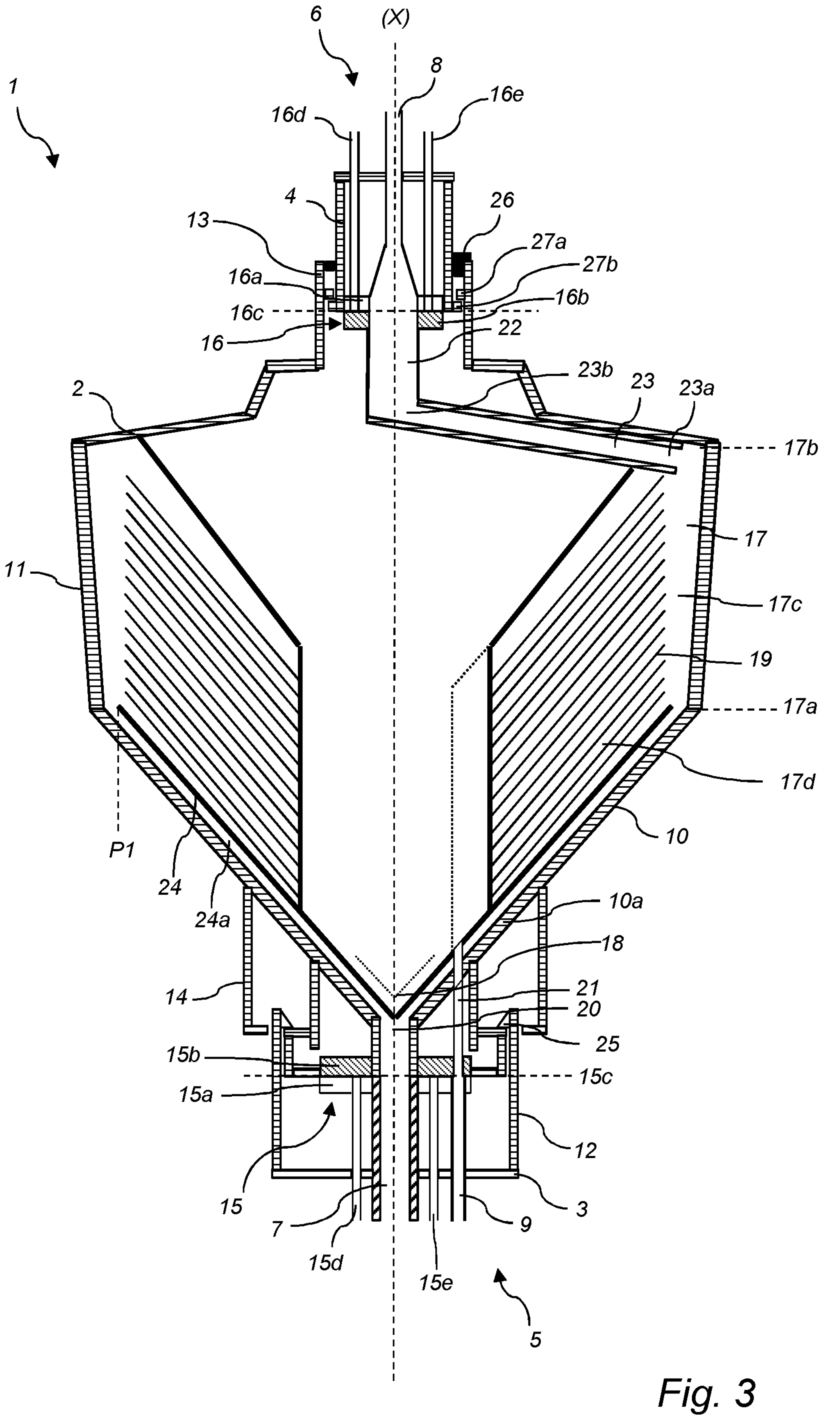
FIG. 3 is a schematic section view of an exchangeable separation insert according to the present disclosure.

FIG. 3 shows a schematic illustration of cross-section of an embodiment of exchangeable separation insert 1 of the present disclosure. The insert 1 comprises a rotor casing 2 arranged to rotate around rotational axis (X), a first, lower stationary portion 3, and a second, upper stationary portion 4. The rotor casing 1 is arranged between the first stationary portion 3 and the second stationary portion 4. The first stationary portion 3 is thus arranged at the lower axial end 5 of the insert, whereas the second stationary portion 4 is arranged at the upper axial end 6 of the insert 1.

The feed inlet 20 is in this example arranged at the axial lower end 5, and the feed is supplied via a stationary inlet conduit 7 arranged in the first stationary portion 3. The stationary inlet conduit 7 may comprise a tubing, such as a plastic tubing. The stationary inlet conduit 7 is arranged at the rotational axis (X) so that the material to be separated is supplied at the rotational centre. The feed inlet 20 is for receiving the fluid mixture to be separated.

The feed inlet 20 is in this embodiment arranged at the apex of an inlet cone 10*a*, which on the outside of the insert 1 also forms the first frustoconical outer surface 10. There is further a distributor 24 arranged in the feed inlet for distributing the fluid mixture from the inlet 24 to the separation space 17.

The separation space 17 comprises a radially outer heavy phase collection space 17*c* that extends axially from a first, lower axial position 17*a* to a second, upper axial position 17*b*. The separation space further comprises a radially inner space formed by the interspaces between the separation discs of the stack 19.

The distributor 24 has in this embodiment a conical outer surface with the apex at the rotational axis (X) and pointing toward the lower end 5 of the insert 1. The outer surface of the distributor 24 has the same conical angle as the inlet cone 10*a*. There is further a plurality of distributing channels 24*a* extending along the outer surface for guiding the fluid mixture to be separated continuously axially upwards from an axially lower position at the inlet to an axially upper position in the separation space 17. This axially upper position is substantially the same as the first, lower axial position 17*a* of the heavy phase collection space 17*c* of the separation space 17. The distribution channels 24*a* may for example have a straight shape or a curved shape, and thus extend between the outer surface of the distributor 24 and the inlet cone 24*a*. The distribution channels 24 may be diverging from an axially lower position to an axially upper position. Furthermore, the distribution channels 24 may be in the form of tubes extending from an axially lower position to an axially upper position.

However, the distribution channels 24*a* may also be arranged to supply the liquid or fluid to be separated to the separation space at a radial position that is within the stack of separation discs, e.g. by axial distribution openings in the distributor and/or the stack of separation discs. Such openings may form axial distribution channels within the stack.

There is further a stack 19 of frustoconical separation discs arranged coaxially in the separation space 17. The separation discs in the stack 19 are arranged with the imaginary apex pointing to the axially lower end 5 of the separation insert, i.e. towards the inlet 20. The imaginary apex 18 of the lowermost separation disc in the stack 19 may be arranged at a distance that is less than 10 cm from the first stationary portion 3 in the axial lower end 5 of the insert 1. The stack 19 may comprise at least 20 separation discs, such as at least 40 separation discs, such as at least 50 separation discs, such as at least 100 separation discs, such as at least 150 separation discs. For clarity reasons, only a few discs are shown in FIG. 1. In this example, the stack 19 of separation discs is arranged on top of the distributor 24, and the conical outer surface of the distributor 24 may thus have the same angle relative the rotational axis (X) as the conical portion of the frustoconical separation discs. The conical shape of the distributor 24 has a diameter that is about the same or larger than the outer diameter of the separation discs in the stack 19. Thus, the distribution channels 24*a* may thus be arranged to guide the fluid mixture to be separated to an axial position 17*a* in the separation space 17 that is at a radial position $P_1$ that is outside the radial position of the outer circumference of the frustoconical separation discs in the stack 19.

The heavy phase collection space 17*c* of the separation space 17 has in this embodiment an inner diameter that continuously increases from the first, lower axial position 17*a* to the second, upper axial position 17*b*. There is further an outlet conduit 23 for transporting a separated heavy phase from the separation space 17. This conduit 23 extends from a radially outer position of the separation space 17 to the heavy phase outlet 22. In this example, the conduit is in the form of a single pipe extending from a central position radially out into the separation space 17. However, there may be at least two such outlet conduits 23, such as at least three, such as at least five, outlet conduits 23. The outlet conduit 23 has thus a conduit inlet 23*a* arranged at the radially outer position and a conduit outlet 23*b* at a radially inner position, and the outlet conduit 23 is arranged with an upward tilt from the conduit inlet 23*a* to the conduit outlet 23*b*. As an example, the outlet conduit may be tilted with an upward tilt of at least 2 degrees, such as at least five degrees, such as at least ten degrees, relative the radial plane.

The outlet conduit 23 is arranged at an axially upper position in the separation space 17, such that the outlet conduit inlet 23*a* is arranged for transporting separated heavy phase from the axially uppermost position 17*b* of the separation space 17. The outlet conduit 23 further extends radially out into the separation space 17 so that outlet conduit inlet 23*a* is arranged for transporting separated heavy phase from the periphery of the separation space 17, i.e. from the radially outermost position in the separation space at the inner surface of the separation space 17.

The conduit outlet 23*b* of the stationary outlet conduit 23 ends at the heavy phase outlet 22, which is connected to a stationary outlet conduit 8 arranged in the second, upper stationary portion 4. Separated heavy phase is thus discharged via the top, i.e. at the upper axial end 6, of the separation insert 1.

Furthermore, separated liquid light phase, which has passed radially inwards in the separation space 17 through the stack of separation discs 19, is collected in the liquid light phase outlet 21 arranged at the axially lower end of the rotor casing 2. The liquid light phase outlet 21 is connected to a stationary outlet conduit 9 arranged in the first, lower stationary portion 3 of the insert 1. Thus, separated liquid light phase is discharged via the first, lower, axial end 5 of the exchangeable separation insert 1.

The stationary outlet conduit 9 arranged in the first stationary portion 3 and the stationary heavy phase conduit 8 arranged in the second stationary portion 4 may comprise tubing, such as plastic tubing.

There is further a lower rotatable seal 15, which separates the rotor casing 2 from the first stationary portion 3, arranged within lower seal housing 12 and an upper rotatable seal, which separates the rotor casing from the second stationary portion 4, arranged within upper seal housing 13. The first 15 and second 16 rotatable seals are hermetic seals, thus forming mechanically hermetically sealed inlet and outlets.

The lower rotatable seal 15 may be attached directly to the inlet cone 10*a* without any additional inlet pipe, i.e. the inlet may be formed at the apex of the inlet cone directly axially above the lower rotatable seal 15. Such an arrangement enables a firm attachment of the lower mechanical seal at a large diameter to minimize axial run-out.

The lower rotatable seal 15 seals and connects both the inlet 20 to the stationary inlet conduit 7 and seals and connects the liquid light phase outlet 21 to the stationary liquid light phase conduit 9. The lower rotatable 15 seal thus forms a concentric double mechanical seal, which allows for easy assembly with few parts. The lower rotatable seal 15 comprises a stationary part 15*a* arranged in the first stationary portion 3 of the insert 1 and a rotatable part 15*b* arranged in the axially lower portion of the rotor casing 2. The rotatable part 15*b* is in this embodiment a rotatable sealing ring arranged in the rotor casing 2 and the stationary part 15*a* is a stationary sealing ring arranged in the first stationary portion 3 of the insert 1. There are further means (not shown), such as at least one spring, for bringing the rotatable sealing ring and the stationary sealing ring into engagement with each other, thereby forming at least one sealing interface 15*c* between the rings. The formed sealing interface extends substantially in parallel with the radial plane with respect to the axis of rotation (X). This sealing interface 15*c* thus forms the border or interface between the rotor casing 2 and the first stationary portion 3 of the insert 1. There are further connections 15*d* and 15*e* arranged in the first stationary portion 3 for supplying a liquid, such as a cooling liquid, buffer liquid or barrier liquid, to the lower rotatable seal 15. This liquid may be supplied to the interface 15*c* between the sealing rings.

In analogy, the upper rotatable seal 16 seals and connects the heavy phase outlet 22 to the stationary outlet conduit 8. The upper mechanical seal may also be a concentric double mechanical seal. The upper rotatable seal 16 comprises a stationary part 16*a* arranged in the second stationary portion 4 of the insert 1 and a rotatable part 16*b* arranged in the axially upper portion of the rotor casing 2. The rotatable part 16*b* is in this embodiment a rotatable sealing ring arranged in the rotor casing 2 and the stationary part 16*a* is a stationary sealing ring arranged in the second stationary portion 4 of the insert 1. There are further means (not shown), such as at least one spring, for bringing the rotatable sealing ring and the stationary sealing ring into engagement with each other, thereby forming at least one sealing interface 16*c* between the rings. The formed sealing interface 16*c* extends substantially in parallel with the radial plane with respect to the axis of rotation (X). This sealing interface 16*c* thus forms the border or interface between the rotor casing 2 and the second stationary portion 4 of the insert 1. There are further connections 16*d* and 16*e* arranged in the second stationary portion 4 for supplying a liquid, such as a cooling liquid, buffer liquid or barrier liquid, to the upper rotatable seal 16. This liquid may be supplied to the interface 16*c* between the sealing rings.

Furthermore, FIG. 3 shows the exchangeable separation insert in a transport mode. In order to secure the first stationary portion 3 to the rotor casing 2 during transport, there is a lower securing means 25 in the form of a snap fit that axially secures the lower rotatable seal 15 to the cylindrical portion 14 of rotor casing 2. Upon mounting the exchangeable insert 1 in a rotating assembly, the snap fit 25 may be released such that the rotor casing 2 becomes rotatable around axis (X) at the lower rotatable seal.

Moreover, during transport, there is an upper securing means 27*a,b* that secures the position of the second stationary portion 4 relative the rotor casing 2. The upper securing means is in the form of an engagement member 27*a* arranged on the rotor casing 2 that engages with an engagement member 27*b* on the second stationary portion 4, thereby securing the axial position of the second stationary portion 4. Further, there is a sleeve member 26 arranged in a transport or setup position in sealing abutment with the rotor casing 2 and the second stationary portion 4. The sleeve member 26 is further resilient and may be in the form of a rubber sleeve. The sleeve member is removable from the transport or setup position for permitting the rotor casing 2 to rotate in relation to the second stationary portion 4. Thus, the sleeve member 26 seals radially against the rotor casing 2 and radially against the second stationary portion 4 in the setup or transport position. Upon mounting the exchangeable insert 1 in a rotating assembly, the sleeve member may be removed and an axial space between engagement members 27*a* and 27*b* may be created in order to allow rotation of the rotor casing 2 relative the second stationary portion 4.

The lower and upper rotatable seals 15,16 are mechanical seals, hermetically sealing the inlet and the two outlets.

During operation, the exchangeable separation insert 1, inserted into a rotatable member 31, is brought into rotation around rotational axis (X). Liquid mixture to be separated is supplied via stationary inlet conduit 7 to the inlet 20 of the insert, and is then guided by the guiding channels 24 of the distributor 24 to the separation space 17. Thus, the liquid mixture to be separated is guided solely along an axially upwards path from the inlet conduit 7 to the separation space 17. Due to a density difference the liquid mixture is separated into a liquid light phase and a liquid heavy phase. This separation is facilitated by the interspaces between the separation discs of the stack 19 fitted in the separation space 17. The separated liquid heavy phase is collected from the periphery of the separation space 17 by outlet conduit 22 and is forced out via the heavy phase outlet 22 arranged at the rotational axis (X) to the stationary heavy phase outlet conduit 8. Separated liquid light phase is forced radially inwards through the stack 19 of separation discs and led via the liquid light phase outlet 21 out to the stationary light phase conduit 9.

Consequently, in this embodiment, the feed is supplied via the lower axial end 5, the separated light phase is discharged via the lower axial end 5, whereas the separated heavy phase is discharged via the upper axial end 6.

Further, due to the arrangement of the inlet 20, distributor 24, stack 19 of separation discs and the outlet conduit 23 as disclosed above, the exchangeable separation insert 1 is de-aerated automatically, i.e. the presence of air-pockets is eliminated or decreased so that any air present within the rotor casing is forced to travel unhindered upwards and out via the heavy phase outlet. Thus, at stand-still, there are no air pockets, and if the insert 1 is filled up through the feed inlet all air may be vented out through the heavy phase outlet 22. This also facilitates filling the separation insert 1 at standstill and start rotating the rotor casing when liquid mixture to be separated or buffer fluid for the liquid mixture is present within the insert 1.

As also seen in FIG. 3, the exchangeable separation insert 1 has a compact design. As an example, the axial distance between the imaginary apex 18 of the lowermost separation disc in the stack 19 may be less than 10 cm, such as less than 5 cm, from the first stationary portion 3, i.e. less than 10 cm, such as less than 5 cm, from the sealing interface 15*c* of the lower rotatable seal 15.

In the above, the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An exchangeable separation insert for a centrifugal separator comprising:

a rotor casing enclosing a separation space in which a stack of separation discs is arranged, the rotor casing being arranged to rotate around an axis of rotation;

a first stationary portion and a second stationary portion, said rotor casing being axially arranged between said first and said second stationary portions;

a feed inlet for supply of a fluid mixture to be separated to said separation space;

a light phase outlet for discharge of a separated phase of a first density, and a heavy phase outlet for discharge of a separated phase of a second density higher than said first density, wherein said feed inlet is arranged at a first axial end of said rotor casing, and wherein one of said light phase outlet and heavy phase outlet is arranged at a second axial end, opposite the first axial end, of the rotor casing;

a first rotatable seal for sealing and connecting said feed inlet to a stationary inlet conduit in said first stationary portion; and a second rotatable seal for sealing and connecting one of said light phase outlet and heavy phase outlet to a stationary outlet conduit in said second stationary portion, wherein the rotor casing, the first stationary portion, and the second stationary portion form a pre-assembled insert configured to be inserted into a rotatable member of the centrifugal separator.

2. The exchangeable separation insert according to claim 1, wherein said light phase outlet is arranged at the first axial end and the heavy phase outlet is arranged at the second axial end, and wherein said second rotatable seal is for sealing and connecting said heavy phase outlet to the stationary outlet conduit in said second stationary portion.

3. The exchangeable separation insert according to claim 2, wherein said first rotatable seal is arranged for sealing and connecting said light phase outlet to a stationary outlet conduit in said first stationary portion.

4. The exchangeable separation insert according to claim 1, wherein the rotor casing is free of any further outlets for separated phases.

5. The exchangeable separation insert according to claim 1, wherein a heavy phase collection space of the separation space extends from a first axial position to a second axial position, and wherein the inner diameter of the separation space continuously increases from said first to said second axial position.

6. The exchangeable separation insert according to claim 1, further comprising at least one outlet conduit arranged for transporting the separated phase of a second density from a radially outer position of the separation space to the heavy phase outlet.

7. The exchangeable separation insert according to claim 6, wherein said at least one outlet conduit is arranged at the axially upper portion of the separation space.

8. The exchangeable separation insert according to claim 1, wherein the first stationary portion is arranged at an axial distance that is less than 20 cm from a heavy phase collection space of said separation space.

9. The exchangeable separation insert according to claim 1, wherein the stationary inlet conduit is arranged at the rotational axis.

10. The exchangeable separation insert according to claim 1, wherein the stationary outlet conduit is arranged at the rotational axis.

11. The exchangeable separation insert according to claim 1, wherein the rotor casing is arranged to be solely externally supported by external bearings.

12. The exchangeable separation insert according to claim 1, wherein the outer surface of the rotor casing comprises a first and second frustoconical portion defining the separation space therein, wherein the first frustoconical portion has an opening angle that is larger than the opening angle of the second frustoconical portion, and wherein an imaginary apex of the first and second frustoconical portions both point in the same axial direction along the rotational axis.

13. The exchangeable separation insert according to claim 12, wherein the opening angle of the second frustoconical portion is such that the outer surface of second frustoconical portion forms an angle a relative the rotational axis that is less than 10 degrees.

14. The exchangeable separation insert according to claim 1, wherein the stack of separation discs comprises frustoconical separation discs.

15. The exchangeable separation insert according to claim 14, wherein said frustoconical separation discs are arranged with an imaginary apex pointing towards said first stationary portion.

16. The exchangeable separation insert according to claim 15, wherein the first stationary portion is arranged at an axial distance that is less than 20 cm from a heavy phase collection space of said separation space.

17. The exchangeable separation insert according to claim 14, wherein an imaginary apex of the axially lowermost separation disc that is closest to the first axial end of the rotor casing is arranged less than 10 cm from the first stationary portion.

18. The exchangeable separation insert according to claim 1, wherein the exchangeable separation insert forms the pre-assembled insert configured to be handled as one unit.

19. A method for separating at least two components of a fluid mixture which are of different densities comprising the steps of:

a) providing a centrifugal separator comprising the exchangeable separation insert a) according to claim 1;

b) supplying said fluid mixture to the feed inlet to said separation space;

c) discharging a separated light phase from said separation space via the light phase c) outlet; and d) discharging a separated heavy phase from said separation space via the heavy phase outlet.

20. The method as claimed in claim 19, wherein the fluid mixture is a cell culture mixture, such as a mammalian cell culture mixture.

* * * * *